United States Patent
Kogan

(10) Patent No.: US 11,260,527 B2
(45) Date of Patent: Mar. 1, 2022

(54) CONTROLLING A ROBOT

(71) Applicant: KUKA Deutschland GmbH, Augsburg (DE)

(72) Inventor: Yevgen Kogan, Augsburg (DE)

(73) Assignee: KUKA Deutschland GmbH, Augsburg (DE)

(*) Notice: Subject to any disclaimer, the term of this patent is extended or adjusted under 35 U.S.C. 154(b) by 180 days.

(21) Appl. No.: 16/622,642

(22) PCT Filed: May 14, 2018

(86) PCT No.: PCT/EP2018/062335
§ 371 (c)(1),
(2) Date: Dec. 13, 2019

(87) PCT Pub. No.: WO2018/228762
PCT Pub. Date: Dec. 20, 2018

(65) Prior Publication Data
US 2021/0138641 A1    May 13, 2021

(30) Foreign Application Priority Data

Jun. 13, 2017 (DE) ............... 10 2017 005 581.5

(51) Int. Cl.
*B25J 9/16* (2006.01)
*B25J 13/08* (2006.01)

(52) U.S. Cl.
CPC ........... *B25J 9/1633* (2013.01); *B25J 9/1605* (2013.01); *B25J 9/1651* (2013.01); *B25J 13/085* (2013.01);
(Continued)

(58) Field of Classification Search
CPC ...... B25J 9/1633; B25J 9/1605; B25J 9/1651; B25J 13/085; B25J 9/1674; B25J 9/1602;
(Continued)

(56) References Cited

U.S. PATENT DOCUMENTS 6,748,298 B2   6/2004  Heiligensetzer
9,505,131 B2   11/2016 Nishida et al.
(Continued)

FOREIGN PATENT DOCUMENTS

DE   19728357 C2   9/2001
DE   10226853 B3   2/2004
(Continued)

OTHER PUBLICATIONS

Lorenzo Sciavicco et al, "Modelling and control of robot manipulators", Modelling and Control of Robot Manipulators, London, ISBN 978-1-4471-0449-0, (Dec. 31, 2000), pp. 272-284, URL: http://link.springer.com/10.1007/978-1-4471-0449-0, (Aug. 17, 2018), XP055500432 [I] 1-15 * p. 272-p. 273 * * p. 280-p. 285*.
(Continued)

*Primary Examiner* — Abby Y Lin
*Assistant Examiner* — Dylan M Katz
(74) *Attorney, Agent, or Firm* — Dorton & Willis, LLP

(57) ABSTRACT

A method for controlling a robot includes applying a setpoint force to a contact point; measuring a contact stiffness at the contact point; and slowing down the moving robot using its drives and/or braking the robot to apply the setpoint force to the contact point by the slowing down and/or slowed down robot depending on the measured contact stiffness, wherein the robot is slowed down before the setpoint force is reached.

14 Claims, 1 Drawing Sheet

(52) U.S. Cl.
CPC ... *B25J 9/1602* (2013.01); *G05B 2219/39319* (2013.01); *G05B 2219/40541* (2013.01)

(58) Field of Classification Search
CPC ....... B25J 19/0004; G05B 2219/39319; G05B 2219/40541; G05B 2219/40215
See application file for complete search history.

(56) References Cited

U.S. PATENT DOCUMENTS

| | | | |
|---|---|---|---|
| 2011/0010008 A1* | 1/2011 | Michel | B25J 9/1638 700/250 |
| 2014/0222025 A1 | 8/2014 | Okamura et al. | |
| 2016/0008988 A1* | 1/2016 | Kennedy | B25J 9/06 414/738 |
| 2016/0026751 A1 | 1/2016 | Walther | |
| 2017/0008171 A1* | 1/2017 | Iwatake | B25J 9/1687 |
| 2017/0083002 A1* | 3/2017 | Hatada | B23K 11/253 |
| 2017/0087676 A1* | 3/2017 | Matake | B25J 13/085 |
| 2018/0049829 A1* | 2/2018 | Yates | A61B 90/06 |

FOREIGN PATENT DOCUMENTS

| | | |
|---|---|---|
| DE | 102006045643 A1 | 4/2008 |
| DE | 102007040130 B3 | 11/2008 |
| DE | 102014011012 A1 | 1/2016 |
| EP | 0 689 903 A1 | 1/1996 |

OTHER PUBLICATIONS

European Patent Office; Search Report in related International Patent Application No. PCT/EP2018/062335 dated Nov. 8, 2018; 2 pages.
European Patent Office; Written Opinion in related International Patent Application No. PCT/EP2018/062335 dated Nov. 8, 2018; 13 pages.
German Patent Office; Examination Report in related German Patent Application No. 10 2017 005 581.5 dated Feb. 19, 2018; 6 pages.
European Patent Office; Office Action in related European Patent Application No. 18 725 454.5 dated Dec. 3, 2021; 7 pages.

* cited by examiner

CONTROLLING A ROBOT

CROSS-REFERENCE TO RELATED APPLICATIONS

This application is a national phase application under 35 U.S.C. § 371 of International Patent Application No. PCT/EP2018/062335, filed May 14, 2018 (pending), which claims the benefit of priority to German Patent Application No. DE 10 2017 005 581.5, filed Jun. 13, 2017, the disclosures of which are incorporated by reference herein in their entirety.

TECHNICAL FIELD

The present invention relates to a method and a control for controlling a robot, and an arrangement with a robot and the control, and a computer program product for performing said method.

BACKGROUND

It is known from internal practice to specify a setpoint force a robot is to apply to a contact point, and to then detect, during the operation of the robot, a current reaction force between the robot and the contact point. As soon as one detects that the reaction force has reached the setpoint force, the robot is slowed down by its drive and/or brakes.

Thereby, the robot may in particular also work in unknown or varying environments, for example drive to workpieces whose positions vary and stop when it contacts them, for example to grip them, work on them or the like.

In particular due to mechanical, electrotechnical and/or control-related inertias or dead times, the robot will nevertheless after-run so that he will only stop with a certain delay after the detection of the applied or reached setpoint force.

Doing this, however, it can penetrate the contact point or the environment around the contact point more deeply, in particular deform it elastically and/or plastically, whereby the actual reaction force will increase in an undesired way beyond the specified setpoint force.

Correspondingly, up to date, before the moving robot contacts the contact point, its speed has been reduced to reduce the impulse and, along with it, the after-running of the robot and the increase of the reaction force involved.

SUMMARY

It is the object of the present invention to improve the operation of a robot. This object is achieved by a method, a control and a computer program product for performing the method, and an arrangement with a robot and control as described herein.

According to one embodiment of the present invention, a method for controlling a robot comprises the following steps:
specifying a setpoint force to a contact point;
measuring a contact stiffness at this contact point; and
slowing down the moving robot by its drives and/or brakes
 to apply and/or exert the setpoint force to the contact point by the slowing down robot and/or slowed down robot or such that, or with the aim that, the slowing down or slowed down robot applies the setpoint force to the contact point, in particular at least, at most and/or within a certain tolerance, on the basis of or depending on the measured contact stiffness, slowing down being already started before the setpoint force is reached.

By slowing down the robot, depending on the contact stiffness measured in advance and/or during contacting, or by taking said contact stiffness into consideration for this slowing down, and by starting, in the process and/or thereby, the slowing down already before the setpoint force is reached, and thus an after-running of the robot with a corresponding excessive force beyond the setpoint force being reduced and preferably, at least essentially, prevented, in one embodiment, the correspondence of the reaction force the slowing down or slowed down robot will finally actually apply to the contact point with the specified setpoint force may be improved, and/or the robot may be moved at an elevated speed even still near the contact point, and thus a clock interval may be in particular reduced.

The robot comprises, in one embodiment, at least three, in particular at least six, in particular at least seven, axes (of motion) or articulations which may be (are) in particular controlled, slowed down, in particular shut down by the drives and/or brakes of the robot.

For a more compact representation, a closed-loop control on the basis of a difference (error) between setpoint and (detected) actual quantities is also referred to as controlling in the sense of the present invention herein. A force in the sense of the present invention may comprise, in particular also be, in a generalized way, an anti-parallel couple of forces, i.e. a moment (torque). Stiffness is understood herein in particular in a manner common in the art as a ratio between a penetration depth or in particular an elastic and/or plastic deformation and a force that is required for this and/or is applied, in particular a quotient of force divided by the penetration depth or deformation, respectively.

In one embodiment, the slowing down or slowed down robot applies the reaction or setpoint force to the contact point by a robot-guided tool or workpiece, or it is provided or adjusted for doing so.

In one embodiment, the slowing down of the moving robot by its drives and/or brakes to apply the setpoint force comprises a corresponding controlling, that means in particular closed-loop controlling, of the drives or brakes, in particular a determination and/or instruction of a setpoint pose of the slowing down or slowed down robot in which it applies or is to apply the specified setpoint force to the contact point, and/or a setpoint movement, in particular a setpoint speed (progression) and/or a setpoint acceleration (progression), depending on the measured contact stiffness and the applied setpoint force.

In particular, in one embodiment, the moving robot is slowed down or caused to stand still by its drives and/or brakes in a first pose to apply the setpoint force if the contact stiffness has a first value, or the contact stiffness is correspondingly measured, and it is slowed down in a second pose where it, in particular the robot-guided tool or workpiece, has penetrated more deeply into the contact point or a greater deformation has been reached, if the contact stiffness has a second value which is smaller than the first value, or the contact stiffness is correspondingly measured.

In one embodiment, slowing down by the drives and/or brakes to apply the setpoint force is started at a first point in time before the setpoint force is reached if the contact stiffness comprises a first value or the same is correspondingly measured, and is started at a later, second point in time before the setpoint force is reached if the contact stiffness comprises a second value which is smaller than the first value, or the contact stiffness is correspondingly measured, in particular slowing down by the drives and/or brakes is initiated, in particular instructed, at the first point in time if the contact stiffness comprises the first value, and is initiated or instructed at the second point in time if the contact stiffness comprises the second value.

In addition or as an alternative, in one embodiment, the robot is slowed down or delayed by its drives and/or brakes to apply the setpoint force in at least one phase to a greater extent if the contact stiffness comprises a or the first value, or the contact stiffness is correspondingly measured, and is at least in this phase slowed down or delayed to a lesser extent if the contact stiffness comprises a value or a second value which is smaller than the first value, or the contact stiffness is correspondingly measured.

In one embodiment, the method comprises the following step: detecting a current or imminent contacting of the contact point by the moving robot, in particular a start or closing of a contact between the robot and the contact point, the moving robot being slowed down by its drives and/or brakes to apply the setpoint force to the contact point by the slowing down or slowed down robot (also) on the basis of or depending on said detected contacting.

The reaction force between the robot and the contact point or the reaction force the robot applies or exerts on the contact point depends, on the one hand, on the contact stiffness and, on the other hand, on the penetration depth or in particular the elastic and/or plastic deformation which in turn depends on the difference of the pose of the robot to its pose when it contacts the contact point or when the contact between the robot and the contact point is started or closed, for example according to a spring law in the general form $F=f_c(x-x_c)$, in particular a linear spring law $F=c\cdot(x-x_c)$ with the contact stiffness function $f_c$ or the contact stiffness factor c, the current position of the robot contact region x, and its position $x_c$ during contacting. In one embodiment, by slowing down the moving robot, in particular slowing down in the first or second pose, start(ing) the slowing down at the first or second point in time, and/or slowing down to a greater or lesser extent, depending on the detected contacting, an after-running of the robot with a corresponding excessive force may be correspondingly reduced and preferably, at least essentially, prevented, and thus the correspondence of the reaction force the slowing down or slowed down robot finally actually applies to the contact point with the specified setpoint force may be improved, and/or the robot may be moved at a higher speed even in the proximity of the contact point, and thus in particular a clock interval may be reduced.

In one embodiment, the moving robot is optionally already slowed down by its drives and/or brakes to apply the setpoint force to the contact point by the slowing down or slowed down robot even before the moving robot contacts the contact point. This permits to avoid, in one embodiment, an excessively deep penetration of the robot with a correspondingly high excessive force beyond the setpoint force even in case of high contact stiffnesses and/or high approaching speeds.

In addition or as an alternative, the moving robot is optionally only slowed down by its drives and/or brakes to apply the setpoint force to the contact point by the slowing down or slowed down robot after the moving robot has already contacted the contact point for this. By detecting a reaction force between the contact point and the robot contacting the same, this permits, in one embodiment, to detect the current contacting on the basis of this reaction force and/or the contact stiffness on the basis of this reaction force.

In one embodiment, one or the reaction force between the contact point and the robot contacting the same is detected, and the current contacting is detected on the basis of this reaction force, in particular a current contacting is detected as soon as the reaction force exceeds a specified threshold value or this is detected. Thereby, the current contacting may in one embodiment be detected precisely and/or detected by means of a corresponding force sensor system of the robot.

In addition or as an alternative, in one embodiment, a distance between the robot and the contact point is detected, in particular by means of at least one robot-guided sensor and/or at least one sensor spaced apart from the robot, in particular (at least) an electric, magnetic and/or optical sensor, in particular (at least) one camera, and the current and/or imminent contacting is detected based on this distance. Thereby, in one embodiment, an imminent contacting may be already detected, and thus slowing down may be started particularly in good time. In addition or as an alternative, in one embodiment, the robot may thereby apply a desired setpoint force to the contact point even without force sensors.

In one embodiment, the method comprises the following step: detecting a current movement, in particular the speed and/or acceleration, of the robot, wherein the moving robot is slowed down by its drives and/or brakes to apply the setpoint force to the contact point by the slowing down or slowed down robot (also) depending on this detected movement, in particular depending on an in particular mathematic (substitution) model of the robot. Thereby, the slowing down of the robot such that it will stop in a pose where it applies the setpoint force to the contact point, and which correspondingly depends on the contact stiffness, may be effected advantageously precisely (more precisely), in particular be pre-controlled and/or controlled by closed-loop control based on a model, wherein in one embodiment, the contact stiffness is taken into consideration in the model.

In particular, in one embodiment, the moving robot is slowed down by its drives and/or brakes to apply the setpoint force to a greater extent in at least one phase, and/or slowing down is started by the drives and/or brakes to apply the setpoint force at a first point in time, if the robot, in particular a robot contact region, has a first speed during contacting and is at least in this phase slowed down to a lesser extent, and/or slowing down is started at a later, second point in time if the robot (contact region) has, during contacting, a second speed which is smaller than the first speed since the reaction force increases more quickly in case of a higher contacting speed.

In one embodiment, the contact stiffness is measured depending on a stiffness of the contact point and/or a stiffness of the robot, that means in particular, in one embodiment, the compliance, in particular elasticity, of the overall system of contact point and robot is taken into consideration. Thereby, the slowing down of the robot such that it stops in a pose where it applies the setpoint force to the contact point and which correspondingly depends on the contact stiffness, may be affected advantageously precisely (more precisely). If in contrast the contact stiffness is measured independent of a stiffness of the contact point or independent of a stiffness of the robot, this may facilitate the measurement thereof in one embodiment.

In one embodiment, the contact stiffness may be measured, in particular estimated, theoretically, in particular numerically, in particular by simulation, in particular on the basis of or depending on well-known material and/or geometry parameters of the contact point and/or the robot.

In addition or as an alternative, the contact stiffness may be, in one embodiment, measured empirically in particular by detecting a reaction force between the contact point and the robot contacting the contact point, and/or one or more reaction forces between the environment of the contact point and the robot contacting this environment, and by measuring the contact stiffness on the basis of this detected reaction force or reaction forces. A reaction force between the contact point or the environment and the robot is in one embodiment detected by a force sensor system of the robot, in particular one or more force sensors in its articulations and/or at its robot or tool flange, wherein, as illustrated above, forces may also include moments, force sensors in the sense of the present invention, that means in particular also moment sensors.

Thereby, the contact stiffness may in one embodiment be advantageously measured precisely (more precisely) and/or online.

In one embodiment, the reaction force is detected and the contact stiffness measured based on this reaction force, while the robot contacts the contact point already to apply the setpoint force by the slowing down or slowed down robot. Thereby, in one embodiment, the contact stiffness may be measured precisely (more precisely) for the current contact point.

In another embodiment, the robot contacts the contact point and/or its environment initially once or several times for test purposes. In the process, the reaction force is detected (in each case) and the contact stiffness is measured based on this reaction force or reaction forces, in particular by averaging, interpolation and/or extrapolation or the like, before the robot will then contact the contact point (again) to apply the setpoint force by the slowing down or slowed down robot. Thereby, the contact stiffness may be, in one embodiment, measured in advance, and one can thus avoid, in particular in case of high contact stiffnesses and high approaching speeds, an excessively deep penetration of the robot with a corresponding high excessive force beyond the setpoint force.

In one embodiment, the contact stiffness is measured depending on a pose of the robot, in particular selected and/or interpolated and/or extrapolated from one of several pose-specific contact stiffnesses that have been determined in advance in one embodiment by the contacting or penetrating for test purposes illustrated above. Thereby, in one embodiment, one may advantageously take into consideration that on the one hand, the stiffness of the robot, and on the other hand, the contact point and thereby its stiffness may depend on the pose of the robot.

According to one embodiment of the present invention, a control for controlling the robot, in particular a hardware- and/or software-, in particular program-based control, is designed to perform a method described herein, and/or comprises:

means for specifying a setpoint force to a contact point;
means for measuring a contact stiffness at this contact point; and
means for slowing down the moving robot by its drives and/or brakes to apply the setpoint force to the contact point by the slowing down and/or slowed down robot depending on the measured contact stiffness, slowing down being started before the setpoint force is reached.

In one embodiment, the control or its means comprises:
means for detecting a current or imminent contacting of the contact point by the moving robot, wherein the moving robot is slowed down by its drives and/or brakes to apply the setpoint force to the contact point by the slowing down and/or slowed down robot depending on this detected contacting;
means for starting the slowing down of the moving robot by its drives and/or brakes to apply the setpoint force to the contact point by the slowing down and/or slowed down robot optionally already before the moving robot contacts the contact point;
means for starting the slowing down of the moving robot by its drives and/or brakes to apply the setpoint force to the contact point by the slowing down or slowed down robot optionally only after the moving robot has contacted the contact point;
means for detecting a reaction force between the contact point and the robot contacting the same and the current contacting based on this reaction force;
means for detecting a distance between the robot and the contact point and the current and/or imminent contacting based on this distance;
means for detecting a current movement of the robot, wherein the moving robot is slowed down by its drives and/or brakes to apply the setpoint force to the contact point by the slowing down or slowed down robot depending on this detected movement, in particular depending on a model of the robot;
means for measuring the contact stiffness depending on a stiffness of the contact point and/or the robot;
means for detecting at least one reaction force between the robot and the contact point and/or its environment and measuring the contact stiffness based on this reaction force;
means for detecting the reaction force and measuring the contact stiffness based on this reaction force, while the robot already contacts the contact point to apply the setpoint force by the slowing down and/or slowed down robot;
means for contacting the contact point and/or its environment by the robot once or several times for test purposes and detecting the reaction force in the process, and measuring the contact stiffness based on this reaction force before the robot contacts the contact point to apply the setpoint force by the slowing down and/or slowed down robot again; and/or
means for measuring the contact stiffness depending on a pose of the robot.

Means in the sense of the present invention may be embodied based on hardware and/or software and in particular comprise an in particular digital processing unit, in particular a microprocessor unit (CPU), preferably connected with a memory and/or bus system via a data or signal link, and/or one or more programs or program modules. The CPU may be designed to process instructions implemented as a program stored in a storage system, to detect input signals from a data bus, and/or to send output signals to a data bus. A storage system may comprise one or more, in particular differing, storage media, in particular optical, magnetic, solid-state and/or other non-volatile media. The program may be designed such that it embodies the methods described herein or is in a position to perform them, so that the CPU may perform the steps of such methods and in particular control the robot thereby.

In one embodiment, one or more, in particular all steps of the method are performed completely or partially in an automated manner, in particular by the control or its means.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
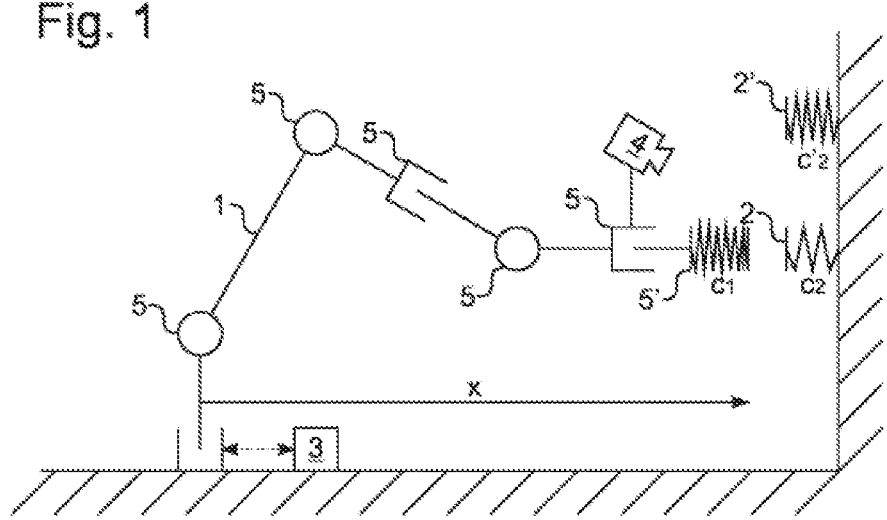
FIG. 1 illustrates an arrangement with a robot and a control for controlling the robot according to one embodiment of the present invention.
Figure 3:
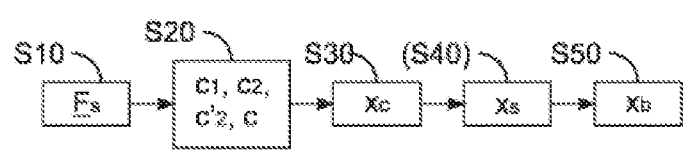
FIG. 3 illustrates a method for controlling the robot according to one embodiment of the present invention.

FIG. 1 shows an arrangement with a robot 1 and a control 3 for controlling the robot 1 according to one embodiment of the present invention, FIG. 3 shows a method for controlling the robot 1 according to one embodiment of the present invention which is performed by the control 3.

In a step S10, a setpoint force $F_s$ which the robot is to apply to a contact point 2 is specified. This may be specified, for example, by a user input, a working program or process of the robot or the like. In particular, in one embodiment, a setpoint force may be specified by a stop condition in a working program.

In a step S20, which may be performed equally before, parallel to or after step S10, a contact stiffness c at the contact point 2 is measured depending on a stiffness of the contact point 2 and a stiffness of the robot 1 which is indicated in FIG. 1 by a spring stiffness $c_1$ of the robot 1 and a spring stiffness $c_2$ of the contact point 2 and results, in the exemplified embodiment, in a simplified manner by $$c = \frac{c_1 \cdot c_2}{c_1 + c_2}.$$

At another contact point 2', the contact stiffness is, for example, $$c' = \frac{c_1 \cdot c_2'}{c_1 + c_2'}$$

as is indicated in FIG. 1 by a corresponding spring stiffness $c'_2$.

This determination of the contact stiffness c or c' may be effected, for example, by the contact points 2, 2' being approached by the robot 1 for test purposes in advance and the robot penetrating into them with a specified, in particular varying force, and the (respective) penetration depth being detected in the process, and/or reversely, the robot 1 penetrating by a specified, in particular varying, penetration depth and the (respective) reaction force being detected in the process.

The contact stiffness may be measured specifically for the contact point, for example, the contact stiffness $$c = \frac{c_1 \cdot c_2}{c_1 + c_2}$$

by the above-described penetration at the contact point 2, and the contact stiffness $$c' = \frac{c_1 \cdot c_2'}{c_1 + c_2'}$$

at the contact point 2', wherein, depending on the current contact point, the corresponding contact stiffness is selected or an interpolation or extrapolation is effected between several contact stiffnesses. Equally, an averaged contact stiffness (c+c')/2 may be uniformly determined for the contact points 2, 2'. It will be appreciated that the two contact points 2, 2' are only intended as a simplified illustration.

Equally, the measurement of the contact stiffness c may also be affected online while the robot 1 is approaching the contact point 2 to already apply the setpoint force $F_s$, in particular at the beginning of a penetration, by comparing the penetration depth and the reaction force detected during this.

In a step S30, a current or imminent contacting $x_c$ of the contact point 2 is detected by the moving robot 1.

This may in particular be effected in that, by means of a force sensor system integrated in drives 5 and/or a force sensor system 5' at the flange of the robot 1, a reaction force between the contact point 2 and the robot 1 contacting the same is detected, and the current contacting is detected based on this reaction force.

Equally, by means of a robot-guided camera 4, which may also be spaced apart from the robot 1 in a modification, a distance between the robot 1 and the contact point 2 is detected, and the current or imminent contacting $x_c$ may be detected on the basis of this distance.

On the basis of the setpoint force $F_s$ specified in step S10, the contact stiffness c measured in step S20, and the contacting $x_c$ detected in step S30, the control 3 determines, in a step S40, a setpoint pose $x_s$ of the robot 1 in which it applies the setpoint force $F_s$.

Figure 2:
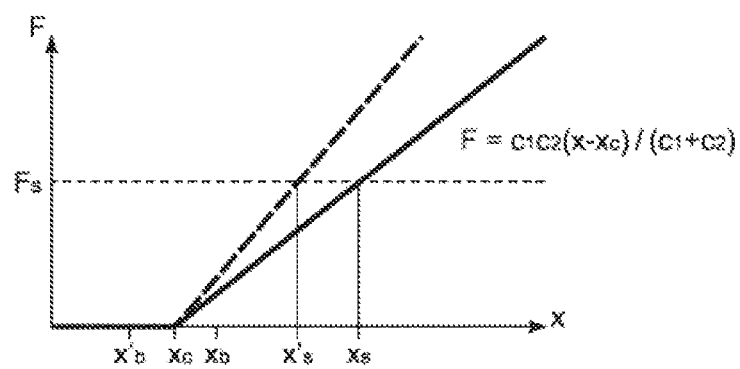
FIG. 2 illustrates the application of a reaction or setpoint force by the robot.

This is illustrated in FIG. 2 in a simplified manner with reference to a linear assumed or approximated model. One can see that the setpoint pose $x_s$ in the exemplified embodiment results from $$x_s = \frac{F_s}{c} - x_c.$$

In a step S50, the control 3 slows down the moving robot 1 by its drives 5 such that it stops in the setpoint pose $x_s$ and, in this pose, correspondingly applies the setpoint force $F_s$ to the contact point 2.

This may be done in particular in a model-based manner taking into consideration the contact stiffness c and detecting the movement $dx/dt$, $d^2x/dt^2$ of the robot 1. If one projects, in a simplified manner, masses and drive forces of the robot onto a mass m and a drive force $F_x$ in the direction of the x-axis direction drawn in FIG. 1, a model results in the following formula, leaving out of consideration further forces, such as friction, gravity, etc.:

$$m\frac{d^2x}{dt^2} = \begin{cases} F_s & \Leftrightarrow x < x_c \\ F_x - c \cdot (x - x_c) & \Leftrightarrow x \geq x_c \end{cases}$$

Based thereon, the corresponding drive forces may be determined and instructed with the detected speed during contacting and the required slowing down at $x_s$.

The setpoint pose $x_s$, however, does not have to be calculated. In a modification, for example, one can determine, in particular predict based on a model, when the setpoint force $F_s$ is reached, from the speed of the robot 1 or its contact region during contacting and the measured spring stiffness c, and the slowing down may be started correspondingly early (earlier) or late (later), and/or slowing down may be correspondingly effected to a greater or lesser extent in phases.

In the example of contact point 2, slowing down is started at $x_b$ before the setpoint force $F_s$ is reached at $x_s$, but only after the moving robot 1 has contacted the contact point 2.

Equally, the slowing down of the moving robot 1 by its drives 5 to apply the setpoint force $F_s$ to the contact point 2' by the slowed down robot may be started, in particular with high contact stiffnesses as indicated by way of example by $c'_2 > c_2$, already at $x'_b$, still before the moving robot contacts the contact point 2' at $x_c$.

This also shows that the contact stiffness may be selected based on or depending on the pose of the robot 1, or interpolation or extrapolation may be affected between several contact stiffnesses. Depending on the pose of the robot 1, it contacts the contact point 2 or 2' so that in step S20, the pose-specific contact stiffness c or c' may be selected for this in each case. In another pose, interpolation or extrapolation may be affected from these contact stiffnesses c, c'.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMERALS 1 robot
2, 2' contact point
3 control
4 camera
5 drive with force or moment sensor
5' force or moment sensor
c contact stiffness
$c_1$ stiffness of robot 1
$c_2$, $c'_2$ stiffness of contact point 2/2'
$F_s$ setpoint force
$x_c$ contacting
$x_s$ setpoint pose
$x_b$, $x'_b$ start of slowing down

What is claimed is:

1. A method for controlling a robot having a plurality of movement axes, and respective drives and brakes associated with the movement axes, the method comprising:
    specifying a setpoint force to be applied by the robot to a contact point;
    determining a contact stiffness at the contact point;
    slowing down the moving robot by at least one of drives or brakes of the robot to apply the setpoint force to the contact point by the slowing down and/or slowed down robot based on the determined contact stiffness;
    wherein movement of the robot is slowed down before the setpoint force is reached;
    detecting at least one reaction force between the robot and at least one of the contact point or the environment of the contact point;
    wherein determining the contact stiffness at the contact point comprises determining the stiffness based on the at least one detected reaction force; and
    contacting at least one of the contact point or the environment of the contact point one or more times for test purposes;
    wherein detecting at least one reaction force comprises detecting the at least one reaction force during the contacting for test purposes; and
    wherein the contact stiffness is determined based on the at least one detected reaction force before the robot contacts the contact point again to apply the setpoint force.

2. The method of claim 1, wherein determining the contact stiffness comprises determining the contact stiffness based on a pose of the robot.

3. The method of claim 1, further comprising:
    detecting a current or imminent contact of the contact point by the moving robot;
    wherein slowing down the moving robot by at least one of drives or brakes of the robot to apply the setpoint force to the contact point further comprises slowing down movement of the robot based on the detected contact.

4. The method of claim 1, wherein the moving robot is already slowed down to apply the setpoint force to the contact point before the moving robot contacts the contact point.

5. The method of claim 1, wherein the moving robot is only slowed down by its drives and/or brakes to apply the setpoint force to the contact point after the moving robot has contacted the contact point.

6. The method of claim 3, further comprising:
    detecting a reaction force between the contact point and the robot;
    wherein detecting the current contact of the contact point is based on the detected reaction force.

7. The method of claim 3, further comprising:
    detecting a distance between the robot and the contact point;
    wherein detecting at least one of the current contact or imminent contact of the contact point is based on the detected distance.

8. The method of claim 1, further comprising:
    detecting a current movement of the robot;
    wherein slowing down the moving robot by at least one of drives or brakes of the robot to apply the setpoint force to the contact point further comprises slowing down movement of the robot based on the detected movement.

9. The method of claim 8, wherein slowing down the moving robot by at least one of drives or brakes of the robot further depends on a model of the robot.

10. The method of claim 1, wherein determining the contact stiffness at the contact point comprises determining the stiffness based on at least one of a stiffness of the contact point or a stiffness of the robot.

11. The method of claim 1, wherein the at least one reaction force is detected and the contact stiffness is determined based on the at least one reaction force while the robot contacts the contact point to apply the setpoint force.

12. A controller for controlling a robot having a plurality of movement axes, and respective drives and brakes associated with the movement axes, the controller configured to:

specify a setpoint force to be applied by the robot to a contact point;

determine a contact stiffness at the contact point;

slow down the moving robot by at least one of drives or brakes of the robot to apply the setpoint force to the contact point by the slowing down and/or slowed down robot based on the determined contact stiffness;

wherein movement of the robot is slowed down before the setpoint force is reached;

detect at least one reaction force between the robot and at least one of the contact point or the environment of the contact point;

wherein determining the contact stiffness at the contact point comprises determining the stiffness based on the at least one detected reaction force; and contact at least one of the contact point or the environment of the contact point one or more times for test purposes;

wherein detecting at least one reaction force comprises detecting the at least one reaction force during the contacting for test purposes; and wherein the contact stiffness is determined based on the at least one detected reaction force before the robot contacts the contact point again to apply the setpoint force.

13. A system comprising:

a robot having a plurality of movement axes, and respective drives and brakes associated with the movement axes; and a controller in accordance with claim 12 for controlling the robot.

14. A computer program product for controlling a robot having a plurality of movement axes, and respective drives and brakes associated with the movement axes, the computer program product comprising program code stored on a non-transitory, computer-readable medium, the computer program, when executed by a computer, causing the computer to:

specify a setpoint force to be applied by the robot to a contact point;

determine a contact stiffness at the contact point; and slow down the moving robot by at least one of drives or brakes of the robot to apply the setpoint force to the contact point by the slowing down and/or slowed down robot based on the determined contact stiffness;

wherein movement of the robot is slowed down before the setpoint force is reached;

detect at least one reaction force between the robot and at least one of the contact point or the environment of the contact point;

wherein determining the contact stiffness at the contact point comprises determining the stiffness based on the at least one detected reaction force; and contact at least one of the contact point or the environment of the contact point one or more times for test purposes;

wherein detecting at least one reaction force comprises detecting the at least one reaction force during the contacting for test purposes; and wherein the contact stiffness is determined based on the at least one detected reaction force before the robot contacts the contact point again to apply the setpoint force.

\* \* \* \* \*